United States Patent [19]
Ward

[11] Patent Number: 6,129,183
[45] Date of Patent: Oct. 10, 2000

[54] BRAKE WEAR SENSOR

[75] Inventor: Andrew John Ward, Birmingham, United Kingdom

[73] Assignee: Lucas Industries Public Limited Company, Solihull, United Kingdom

[21] Appl. No.: 09/117,841

[22] PCT Filed: Feb. 6, 1997

[86] PCT No.: PCT/GB97/00328

§ 371 Date: Aug. 6, 1998

§ 102(e) Date: Aug. 6, 1998

[87] PCT Pub. No.: WO97/29297

PCT Pub. Date: Aug. 14, 1997

[30] Foreign Application Priority Data

Feb. 7, 1996 [GB] United Kingdom ................... 9602439
May 22, 1996 [GB] United Kingdom ................... 9610693

[51] Int. Cl.[7] .................................................. F16D 66/00
[52] U.S. Cl. ................................ 188/1.11 L; 188/1.11 W
[58] Field of Search .................... 188/1.11 L, 1.11 E, 188/1.11 R, 1.11 W

[56] References Cited

U.S. PATENT DOCUMENTS

| | | | |
|---|---|---|---|
| 3,339,676 | 9/1967 | Quinn | 188/1.11 W |
| 3,887,040 | 6/1975 | Simon et al. | 188/1.11 W |

FOREIGN PATENT DOCUMENTS

| | | |
|---|---|---|
| 0 460 378 A2 | 12/1991 | European Pat. Off. . |
| 0 566 006 A1 | 10/1993 | European Pat. Off. . |
| 0 567 155 A1 | 10/1993 | European Pat. Off. . |
| 2206821 | 6/1974 | France . |
| 4041318 | 6/1992 | Germany .......................... 188/1.11 L |
| WO 92/09822 | 6/1992 | WIPO . |
| WO 94/07050 | 3/1994 | WIPO . |
| WO 95/09991 | 4/1995 | WIPO . |
| WO 95/20109 | 7/1995 | WIPO . |

Primary Examiner—Robert J. Oberleitner
Assistant Examiner—Pamela J. Lipka
Attorney, Agent, or Firm—Christensen O'Connor Johnson Kindness PLLC

[57] ABSTRACT

A brake lining wear monitor is disclosed for a brake assembly having a body and a friction lining having an operative face adapted to be applied to a brake rotor. The monitor includes an actuator which applies the brake lining to the rotor, an adjuster driven by the actuator to maintain the linings in close proximity to the brake motor, and having a wheel, and a wear sensor responsive to actuation movement of the brake which is housed within the body of the brake itself without increasing the overall package size of the brake. The wear sensor is driven from the wheel of the adjuster with an end of the sensor remote from the wheel being formed into a connector to provide a compact and integrated unit which can be removed from the brake for service without dismantling the brake assembly itself.

12 Claims, 13 Drawing Sheets

BRAKE WEAR SENSOR

This is a United States national application corresponding to copending international application PCT/GB97/00328, filed Feb. 6, 1997, which designates the United States, the benefit of the filing date of which is hereby claimed under 35 U.S.C. §120, which in turn claims the benefit of British application No. 9602439.3, filed Feb. 7, 1996, and No. 9610693.5, filed May 22, 1996, the benefit of the filing date of which is hereby claimed under 35 U.S.C. 119.

This invention relates to brake lining wear monitoring means particularly for use with vehicle brakes of the kind in which a friction lining has an operative face adapted to be applied to a rotatable braking member, such as a drum or a disc.

It is known to sense the wear of friction lining within a brake assembly through measurement of brake adjustment to compensate the wear.

In our International Publication No. WO95/09991 we disclose the use of an "in adjuster" wear sensor comprising a rotary potentiometer driven by movement of adjuster means through a reduction gearbox. The sensor is integrally mounted with the adjuster means and is both assembled to, and removable from, the brake as part of a sub assembly incorporating the adjuster means.

EP-A-0 492 143 discloses the use of a rotary potentiometer mounted remote from a brake disc and which is adapted to be driven from a spindle of an adjuster. This assembly is also constructed as part of an assembly with the adjuster and as it is attached to the end of a spindle of the adjuster, the overall length of the assembly is increased. It follows that the brake cover plate has to be modified to incorporate an extension with a consequential increase in the overall size of the brake package.

EP-A-0566006 discloses a construction similar to that of EPA-492143 in which a reduction gearbox is provided to reduce the total number of turns of a potentiometer to a maximum of one. Again the potentiometer is driven from a spindle of the adjuster which has the effect of increasing the length of the overall adjuster package with a consequential increase in the total size of the brake package.

International Publication No. WO94/07050 discloses a further addition to the constructions disclosed in the EP-A-04921423 and EP-A0566006. In WO94/07050 a rotary potentiometer with a reduction gearbox is adapted to be mounted as a separate unit assembled to the outside of the brake but, again, adapted to be driven from a spindle of the adjuster. Mounting the sensor on the other side of the cover plate again produces a consequential increase in overall brake package size. In addition a route for external contamination of the brake now exists around the larger periphery of a body of the sensor and this has to be sealed in order to prevent contaminants from entering into the brake mechanism. As the sensor is "surface mounted" it is also susceptible to possible impact damage and moreover where a "clip" fit is used the device may become detached from the brake itself.

In all the known constructions described above the effective length of the adjuster mechanism is relatively increased and in the construction of WO94/07050 the brake may be susceptible to external contaminants and possible accidental disconnection of the sensor.

According to our invention in brake lining wear monitoring means for monitoring the wear condition of a brake assembly in which a friction lining has an operative face adapted to be applied to a brake rotor, in which the monitoring means comprises actuating means for applying the brake lining to the brake rotor, adjusting means adapted to be driven by the actuating means for the purpose of maintaining the brake lining in close proximity to the brake rotor, and wear sensing means responsive to actuation movement of the brake in a brake-applying direction and the wear sensing means is housed within a body of the brake itself without increasing the overall package size of the brake and in which the wear sensing means is driven from a wheel on the adjuster means with the end of the sensing means remote from the wheel being formed into a connector whereby to provide a compact and integrated unit which can be removed from the brake for service without dismantling the brake assembly itself.

The sensing means may be in the form of a linear potentiometer or similar inductive device. Alternatively it may comprise a rotary potentiometer driven from the adjuster wheel through a gear drive.

An external connector for the sensing means may extend axially from the sensing means. In a modification it may be angled substantially at 90° to facilitate installation.

If a flying lead is required a gland seal may be incorporated in the underside of the cover plate of the brake assembly in order to restrict the sensing means from being a serviceable item without dismantling the brake assembly itself.

In another construction the sensing means may be installed in the brake housing in a bore normal to the axis of the adjuster assembly. In such a construction the sensing means is driven from the adjuster wheel through a bevel gear arrangement.

The wear sensing means may be constructed in such a manner that it is automatically re-set by the brake to suit a given pad wear life following service and/or replacement during the service life of the brake.

This can be achieved by providing a transmission mechanism of adjustable length and of which components are freely separable to enable removal of the wear sensing means, without altering a datum position to which the sensing means will automatically be re-set by re-assembly of the transmission mechanism.

Also the wear sensing means may be installed within a casing sealed to the housing of the brake in such a manner that the interior of the casing is sealed from the interior of the brake upon removal of the sensing means for service or replacement.

This can be achieved by installing the sensing means in a hollow tube which depends from a pinion by which the sensing means is operated and which is rotatably sealed in an opening in a casing which, in time, can be sealed by a removable plug, after the sensing means is in its operative position.

Some embodiments of our invention are illustrated in the accompanying drawings in which.

Figure 1:
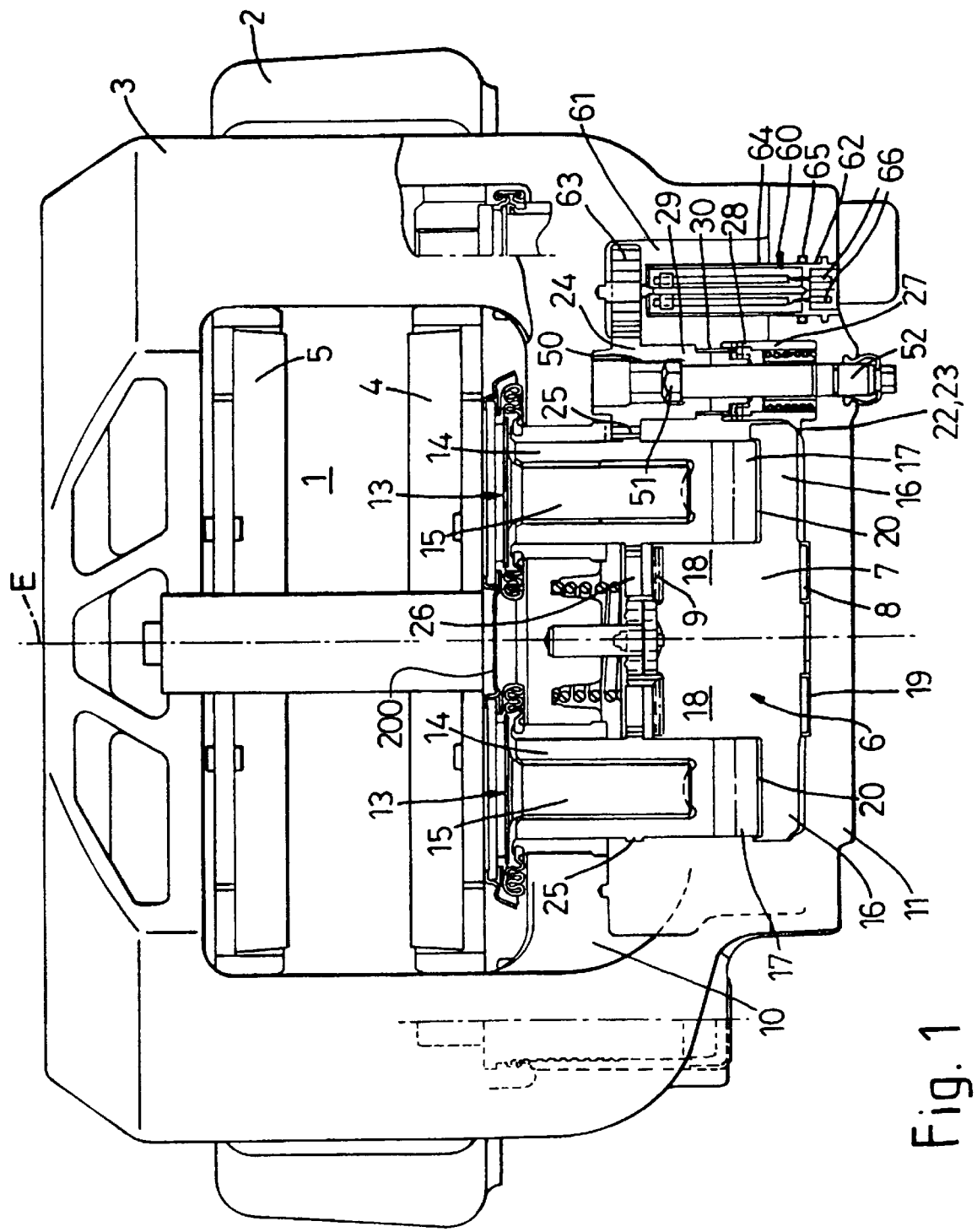
FIG. 1 illustrates a disc brake assembly in part section including a brake wear sensor.

In the disc brake illustrated in FIG. 1 of the accompanying drawings the brake comprises a brake disc 1 and a brake carrier 2. A floating caliper 3 straddles the carrier member 2 and co-operates with two brake pad assemblies 4 and 5, each comprising a rigid backing plate guided to slide between circumferentially spaced drag take surfaces on the carrier, and a pad of friction material for engagement with an adjacent face of the disc 1. A brake actuating device 6 mounted in the caliper is adapted to urge the friction pad assembly 4 into engagement with the disc 1 and the reaction of disc pad assembly on the disc causes the caliper 3 to move bodily in the opposite direction with respect to the carrier 2, in turn to urge the friction pad assembly 5 into engagement with the opposite face of the disc 1.

The actuating device 6 comprises a rotary member 7 which is mounted in an opening in the caliper 2 between respective pairs of needle bearings 8 and 9 carried by a casing 10 and a cover 11 for the outer end of the casing. Two adjustable tappets 13 are housed in the casing 10 of the actuating device 6. Each of these tappets comprises a first internally threaded member 14, and a second externally threaded member 15. The tappets are disposed on opposite sides of a plane of symmetry E, parallel to and spaced from the same. The two second threaded members 15 are interconnected by a thin metal plate 200 so that they cannot be rotated, the metal plate at the same time serving as a heat shield between the members 15 and the friction pad assembly 4.

The rotary member 7 comprises two eccentrics 16 which are arranged in a terminal zone of the rotary member, acting through a roller body 17 onto a respective one of the first threaded members 14. The rotary member 7 is formed with a pair of journal pins 18 between the two eccentrics and the journal pins are supported in a depression 19 at the inner side of the cover 11 through an outer ring of the needle bearings 8. Both first threaded members 14 are connected to the rotary member 7 by a gear connection which comprises an angle drive and a coupling arrangement 20 also the angle drive is formed by meshing bevel teeth 22 and 23. A pinion 24 engages directly with external teeth 25 on the adjacent first threaded member 14 and only then does an intermediate gear 26 follow. The intermediate gear meshes with the external teeth of both first threaded members 14.

The pinion 24 is formed with an inner hexagon 50 which cooperates with a complementary hexagonal formation 51 on a return adjuster shaft 52.

A first sleeve 27 surrounds the shaft 52 and discs 28 between the coupling arrangement 20 and a second sleeve 29 provide a drive connection therebetween.

On actuation of the brake, rotation of the rotary member 7 is converted by the angle drive formed by the two bevel teeth 22 and 23 into rotation of the first sleeve 27 supported on the shaft 52 of the coupling arrangement 20. Once a rotational clearance has been overcome between the disc 28 and the second sleeve 29, a torque will act on the second sleeve 29, through a wrap spring 30, onto the pinion 24, and finally onto the first threaded member 14 through the intermediate gear 26 and the external teeth 25.

The threaded member 14 will not rotate, however, if a brake relief clearance, has been overcome by the above mentioned rotational clearance so the two brake pad assemblies 4 and 5 have engaged the brake disc 1 which consequently transmits reactive force, in correspondence with the actuating force, to the two eccentrics 16 through a tappet formed by the two threaded members 14 and 15. The friction occurring in the readjustment thread pair 13 on that occasion is greater than the torque which the coupling 21 can transmit.

If the rotational clearance between the discs 28 and the second sleeve 29 is overcome upon actuation of the brake, and the brake pad assemblies 4,5 do not reach the brake disc to give rise to a corresponding reactive force, rotation of the first sleeve 27 will be transmitted through the stack of discs 28 to the second sleeve 29 and on through the wrap spring 30 to the pinion 24 and finally to the first threaded member 14 which consequently will be turned in the sense that the tappet an presence together with second threaded member 15 extends in length.

On release of the brake, the rotational movement of the rotary member 8, which is now in the opposite sense, is transmitted to the first sleeve 27 but not further onto the pinion 24 because, in this direction of rotation, the wrap spring 30 opens and thus prevents the pinion 24 from accompanying the rotational movement.

Wear sensing means in the form of a linear potentiometer wear sensor 60 is housed in an opening 61 in the caliper 3 and is accessible through a complementary opening 62 in the cover 11. A pinion 63 at the inner end of the potentiometer meshes with the pinion 24. The axis of the potentiometer 60 is parallel with that of the shaft 52 and it is accommodated in the caliper 3 within the overall actual length of the brake. As illustrated the potentiometer 60 is housed within a cartridge 64 which, in turn, is sealed within the opening in the cover 11 by means of a radial seal 65.

Electrical terminals 66 projecting from the cartridge 64 can be connected to a cable.

In the construction described above the cartridge 64 is a "snap-fit" in the opening of the cover 11. In the modified construction illustrated in FIG. 2 of the accompanying drawings the cartridge 64 can be located in an opening at the circumferentially opposite end of the caliper 3 and with the pinion 63 meshing with the external teeth 25 on the internally threaded member 14 at that end of the brake.

Figure 2:
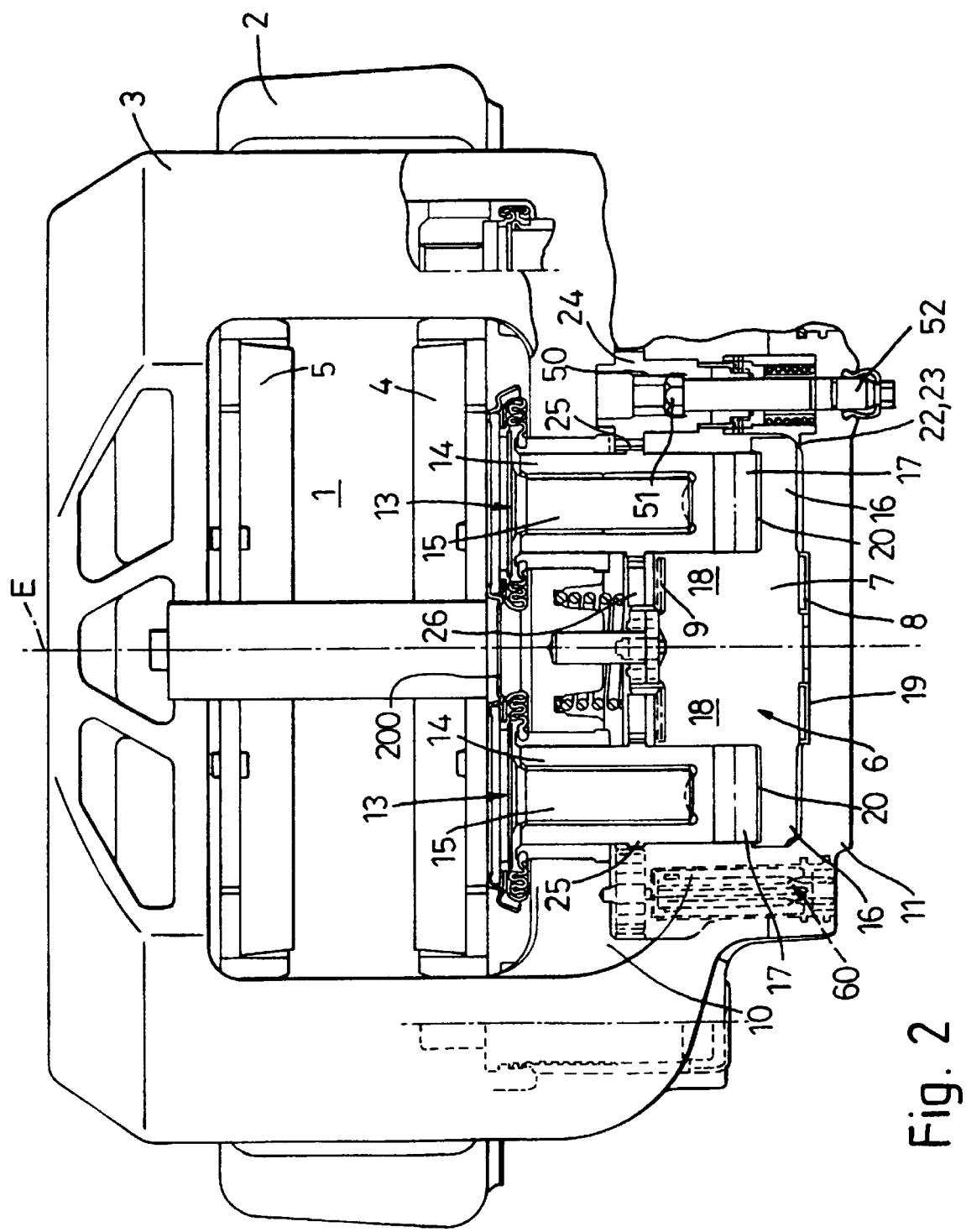
FIG. 2 is a view similar to FIG. 1 but showing the brake wear sensor installed at a different location.

The construction and operation of the brake of FIG. 2 is otherwise the same as that of FIG. 1 and corresponding reference numerals have been applied because of corresponding parts.

Figure 3:
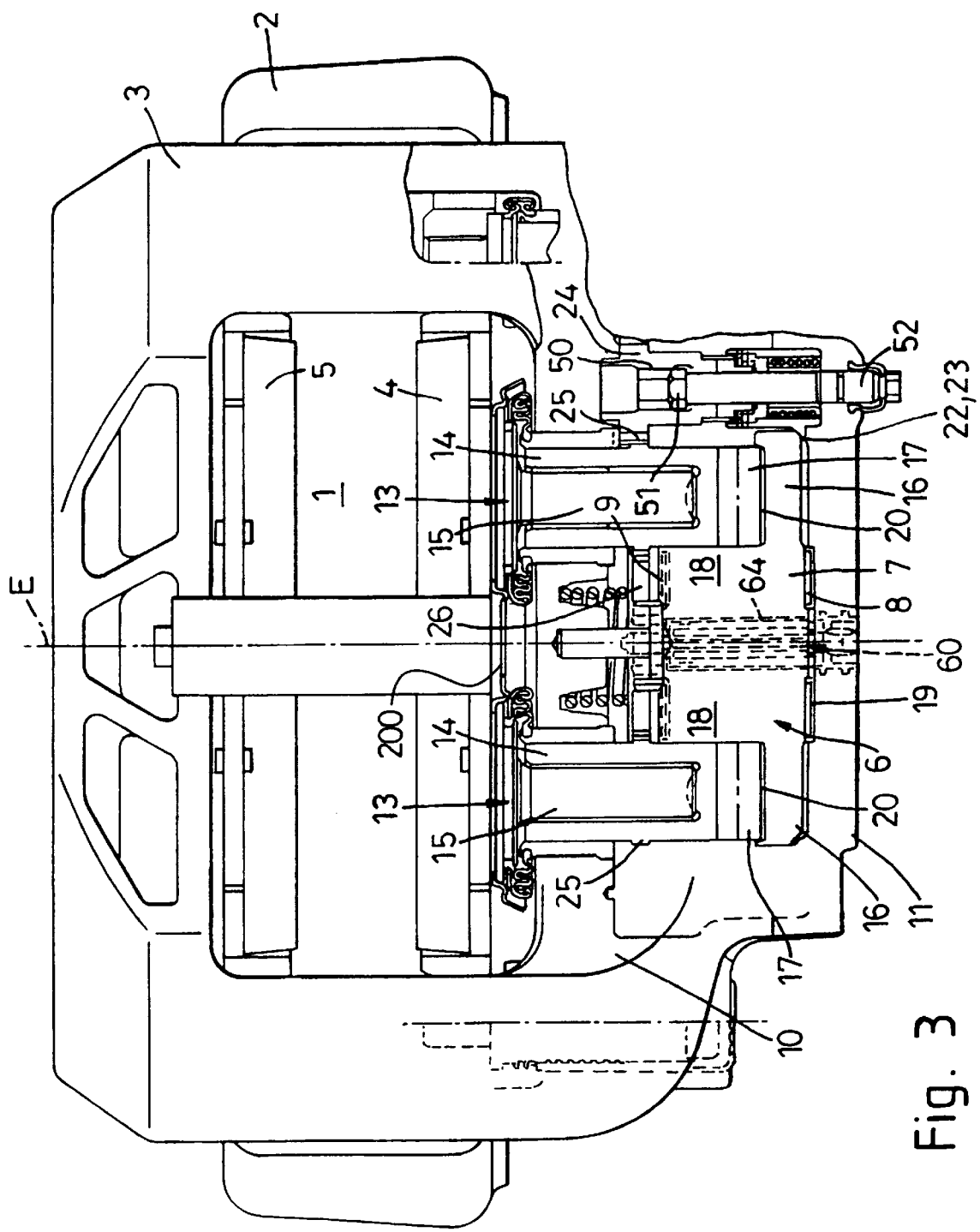
FIG. 3 is another view similar to FIG. 1 but showing the brake wear sensor installed in yet a further location.

In the modification illustrated in FIG. 3 of the accompanying drawings the cartridge 64 extends through an opening in the cover 11 substantially on the axis of the brake and the pinion 63 meshes with the intermediate gear 26.

Again the construction and operation of the embodiment of FIG. 3 is otherwise the same as that of FIG. 1 and corresponding reference numerals have been applied to corresponding parts.

Figure 4:
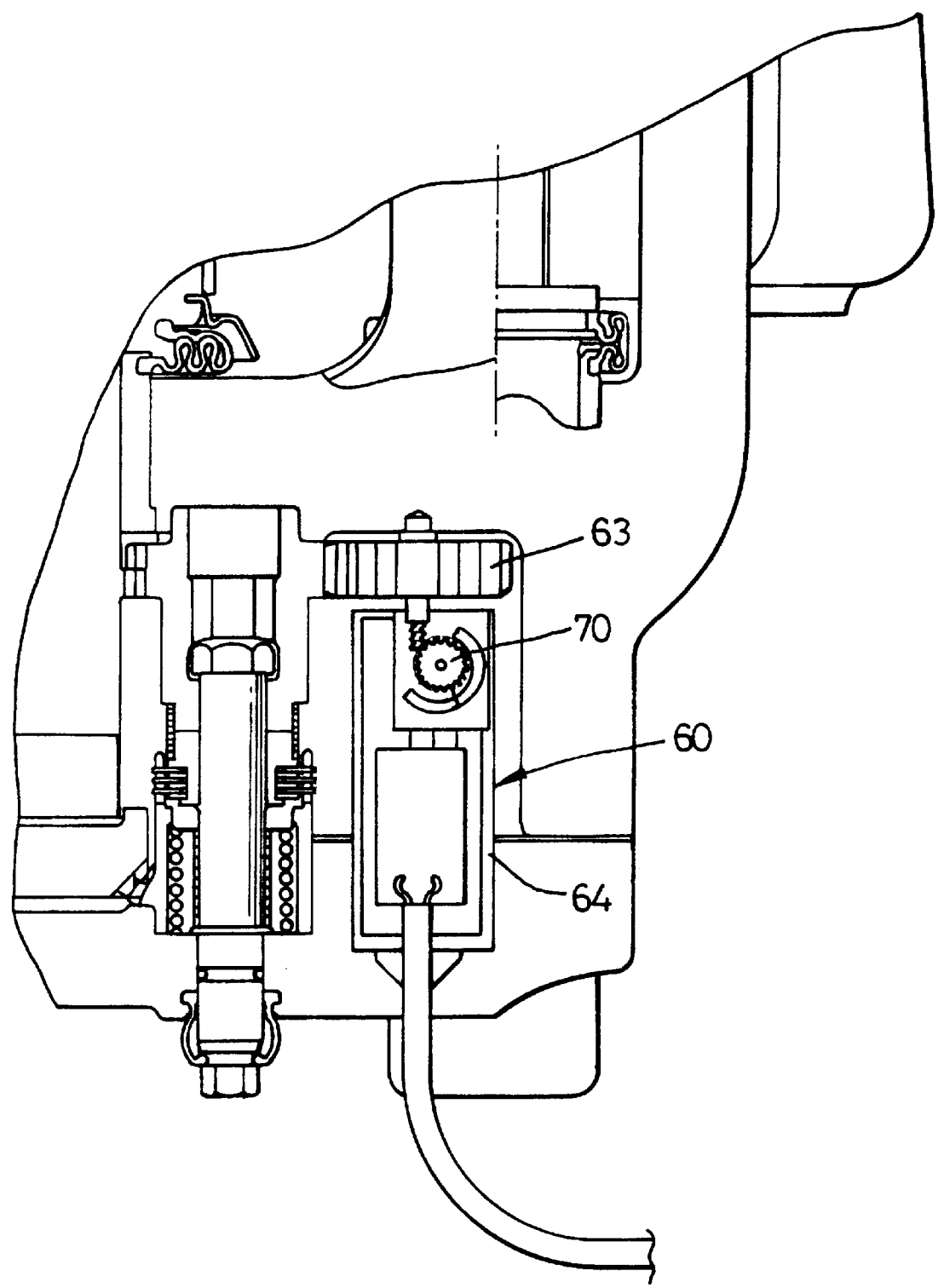
FIG. 4 is a portion of the brake of FIG. 1 incorporating a brake wear sensor of a different construction.

In the modified construction illustrated in FIG. 4 of the accompanying drawings the potentiometer comprises a rotary potentiometer, and the pinion 63 acts on the potentiometer through a reduction gear drive 70.

Figure 5:
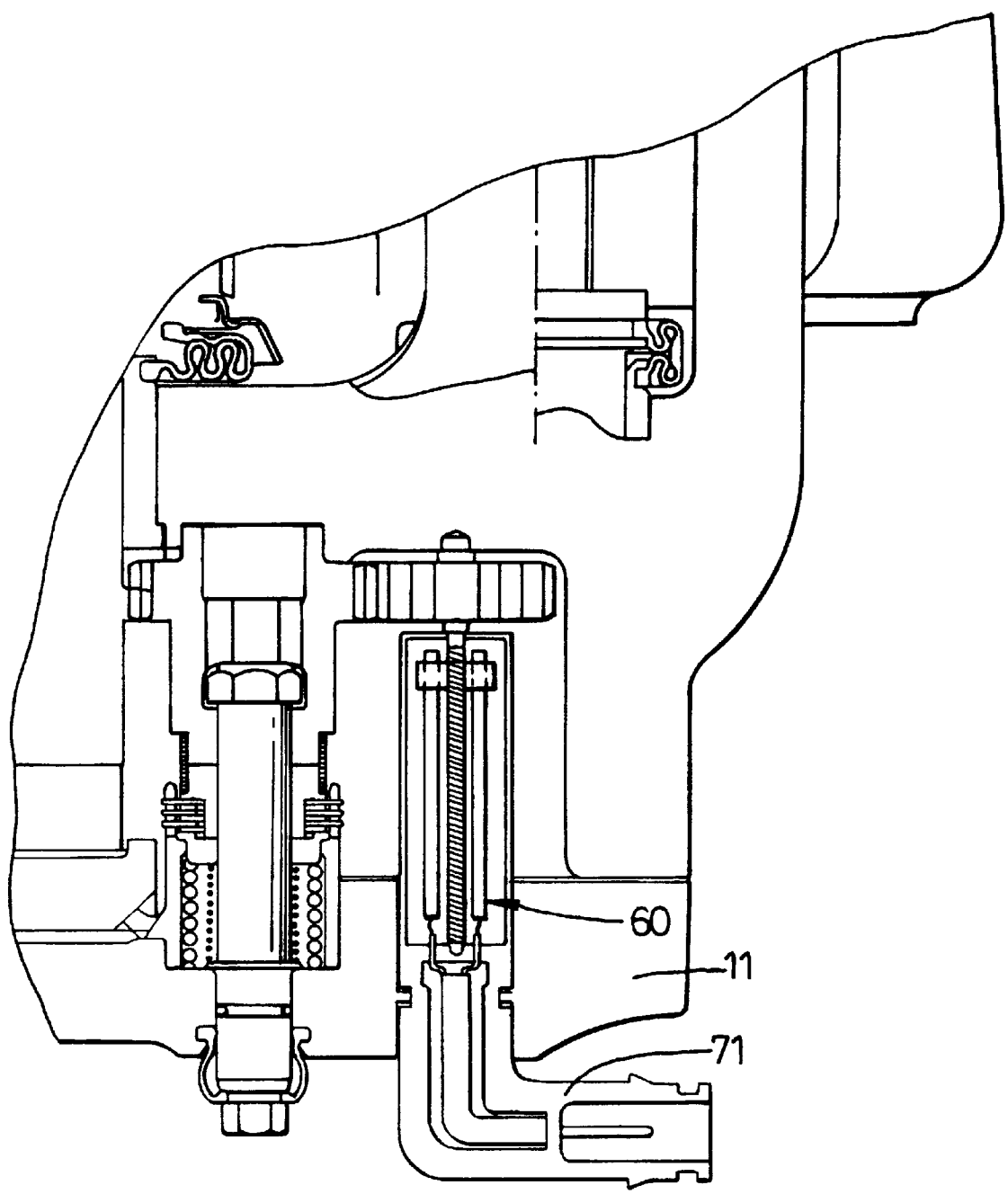
FIG. 5 illustrates a different termination for the brake wear sensor of FIG. 1.

In the embodiment of FIG. 5 of the accompanying drawings the potentiometer 60 has an angled connector 71 from the cover 11.

Figure 6:
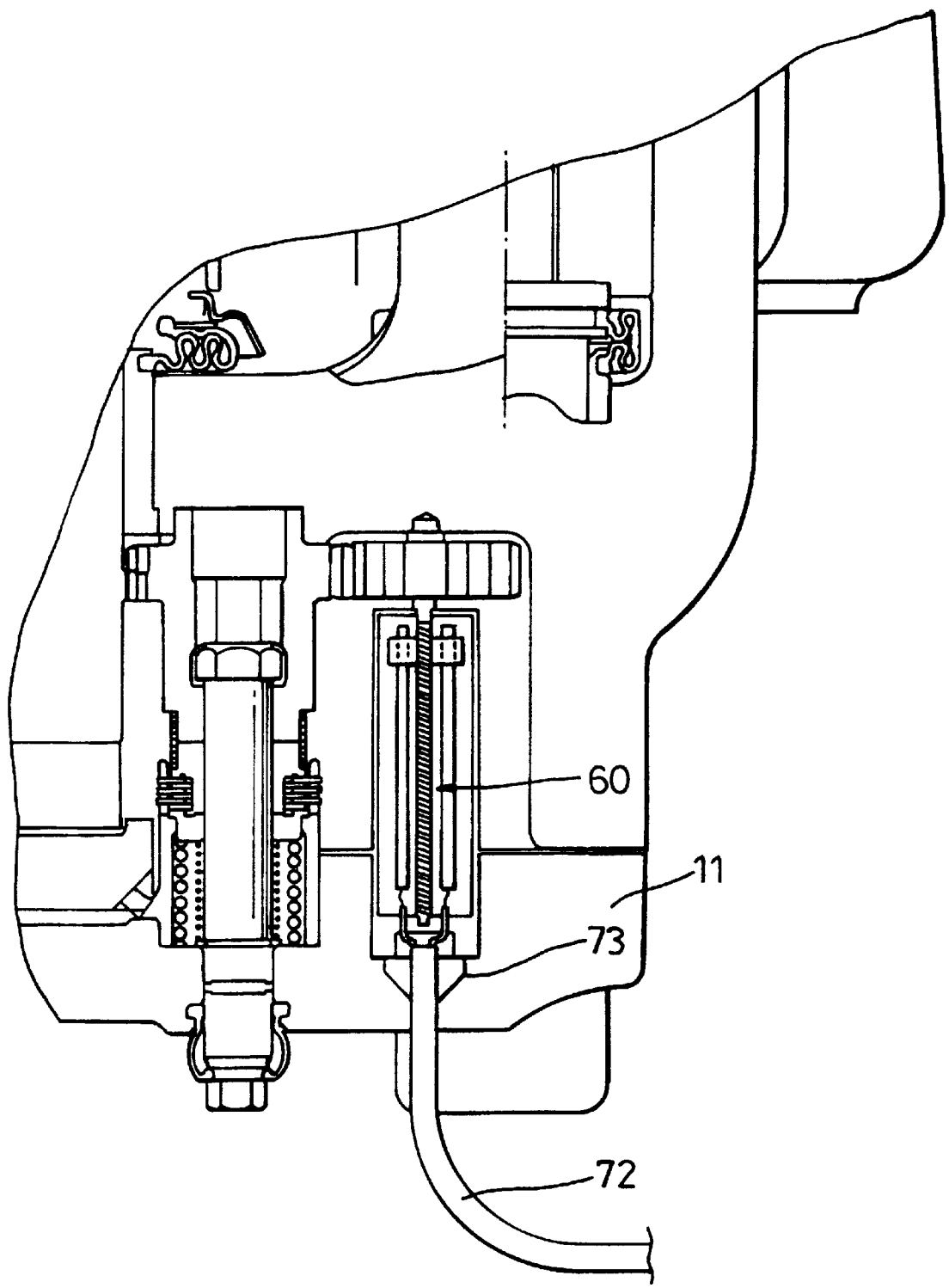
FIG. 6 is a view similar to FIG. 5 but illustrating a different electrical connection for the brake wear sensor.

As illustrated in FIG. 6 when the electrical connection to the potentiometer 60 comprises a flying lead 72 a gland seal 73 may be provided in the underside of the cover 11.

Figure 7:
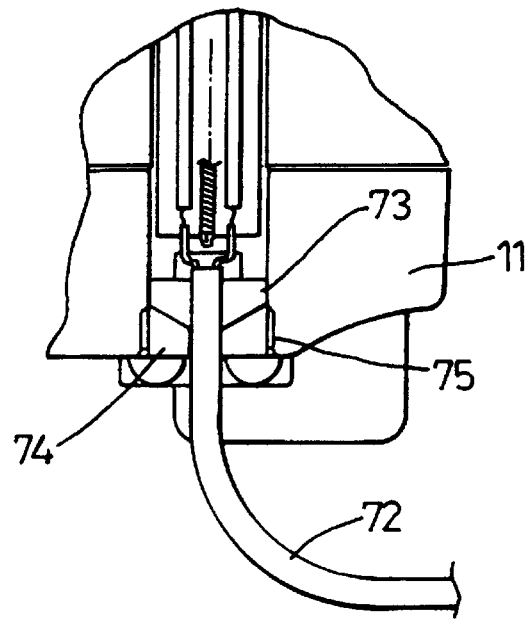
FIG. 7 illustrates a modification for the connection of FIG. 6.

In another modification illustrated in FIG. 7 a gland nut 74 may be screwed into an opening 75 in the cover 11. This enables the flying lead 72 to be maintained and the sensor to be serviced without having to remove the cover 11.

Figure 8:
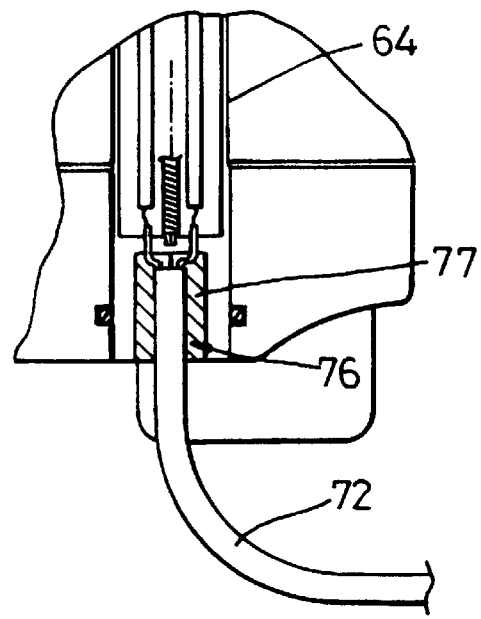
FIG. 8 shows another modification.

In the modification illustrated in FIG. 8 the flying lead 71 is sealed into the end of the cartridge 64 by means of a sealing compound 76 which fills a space defined by a counter bore 77.

Figure 9:
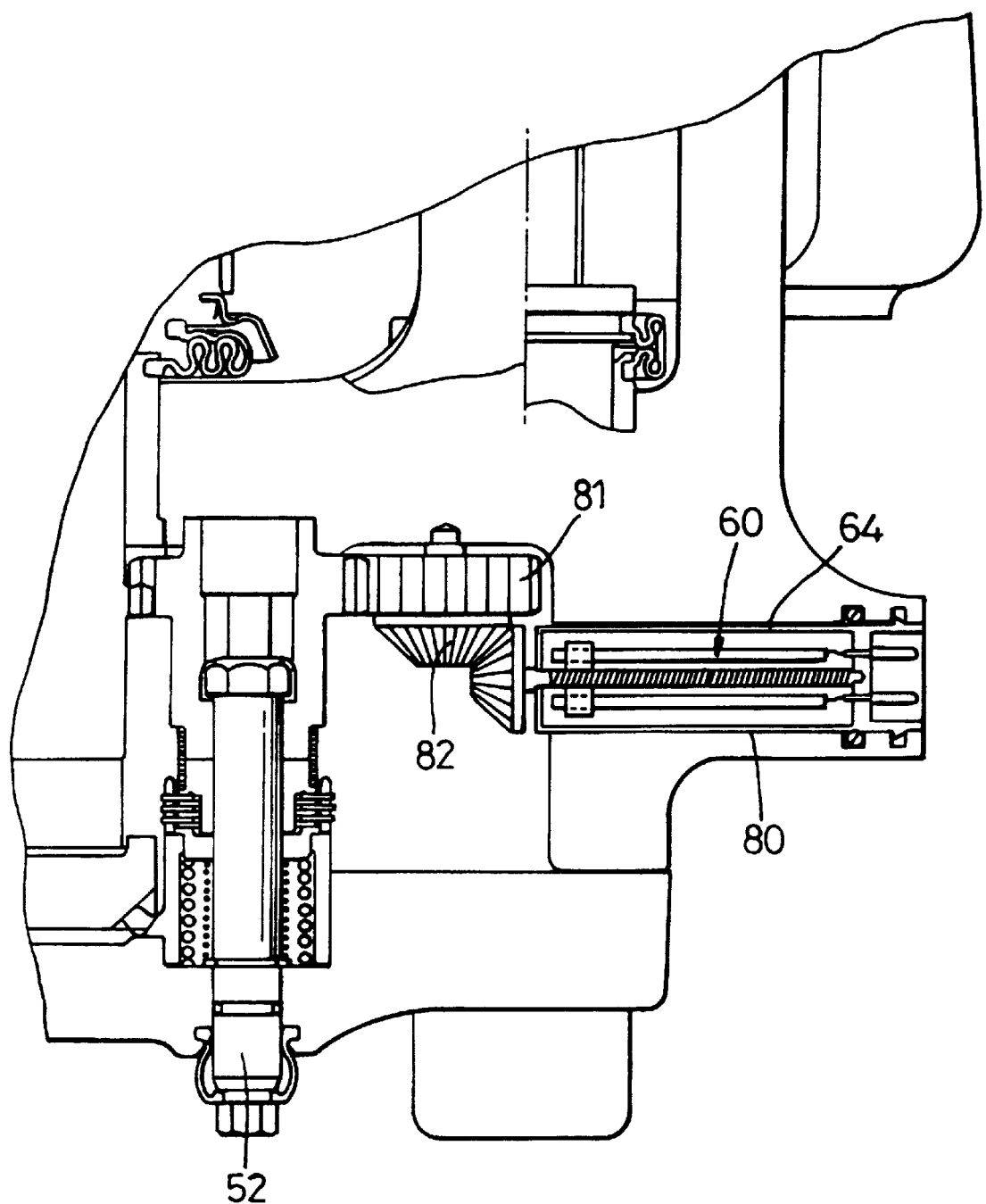
FIG. 9 shows a portion of the brake of FIG. 1 but with the brake wear sensor installed in the brake at a position normal to the axis of the adjusting mechanism.

In the modified construction illustrated in FIG. 9 of the accompanying drawings the cartridge 64 is housed within a bore 80 which is formed in a circumferential end face of the caliper 3 and at which the axis is normal to that of the shaft 52. A pinion 81 meshing with the pinion 24 acts on the potentiometer sensor 60 through an intermediate bevel gear assembly 82.

In other modifications of the constructions described above, the potentiometer may be located at any convenient attitude with respect to that of the shaft 52 with appropriate gearing provided between the potentiometer of the pinion 24 corresponding to the relative angle.

In the constructions described above, when it is necessary to remove the wear sensing means 60, for servicing or replacement the adjustment reference point is lost, and difficulty is experienced in resetting the replacement wear sensing means to take in account the wear condition of the pads of friction material.

Figure 10:
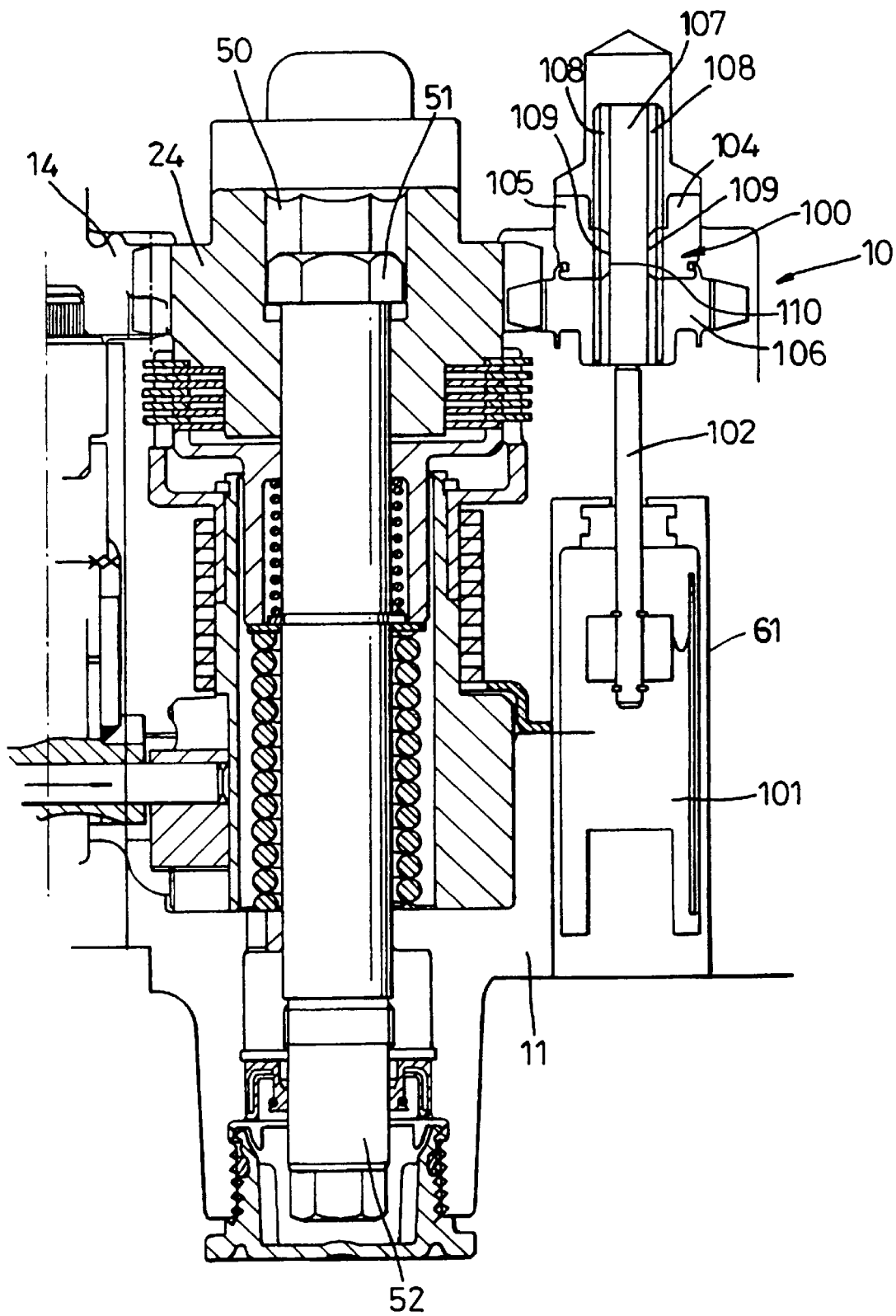
FIG. 10 shows a portion of the brake of FIG. 1 but including a different wear sensor.

In the modified construction illustrated in FIG. 10 of the accompanying drawings the wear sensing means comprises a pinion assembly 100 which acts on a linear potentiometer wear sensor 101 through an axially extending transmission member or rod 102. The rod 102 is coupled to the sensor 101 but is in freely separable cooperation with the pinion assembly 100.

The pinion assembly comprises a bush 104 which is fixedly secured axially against rotation in a bore 105 in the casing 10 at the inner end of the opening 61 in the cover 11, suitably by a pressing operation, a pinion 106 which is rotatably captive to the bush 104 and which meshes with the pinion 24, and an elongate adjuster member 107 in the form of a lead screw acting between the bush 104 and the pinion 106 and with which the rod 102 is in freely separable co-operation.

The adjuster member 107 is externally screw threaded to engage with internal screw threads on the pinion 106, and is formed with axially extending diametrically opposed keyways 108 which slidably receive complementary projections 109 on opposite sides of an aperture 110 in the bush 104 and through which the member 107 extends. The member 107 is thus keyed against rotation but is free to move axially.

In operative, rotation of the pinion 24 imparts a corresponding rotary movement to the pinion 106. Since the adjuster member 107 is keyed against rotation but is free to move axially, the screw-threaded engagement between the pinion 106 and the member 107 causes the member 107 to move relatively towards the potentiometer 101, with that movement transmitted to it through the rod 102. Thus the axial position of the end of the member 107 determines the setting of the potentiometer 101 for a given wear condition of the pads, with the member 107 and the rod 102 co-operating with each other to define a transmission mechanism of adjustable length.

In this construction withdrawal of the potentiometer 101 is accompanied by withdrawal of the rod 102, and the adjuster member 107 remains in its adjusted position.

After servicing or repair, the potentiometer 101 is replaced in the opening 61 with the rod 102 co-operating with the member 107. As the potentiometer 101 is pushed home the co-operation of the rod 102 with the member 107 automatically re-sets the potentiometer 101 to reflect the given wear condition of the pads.

Figure 11:
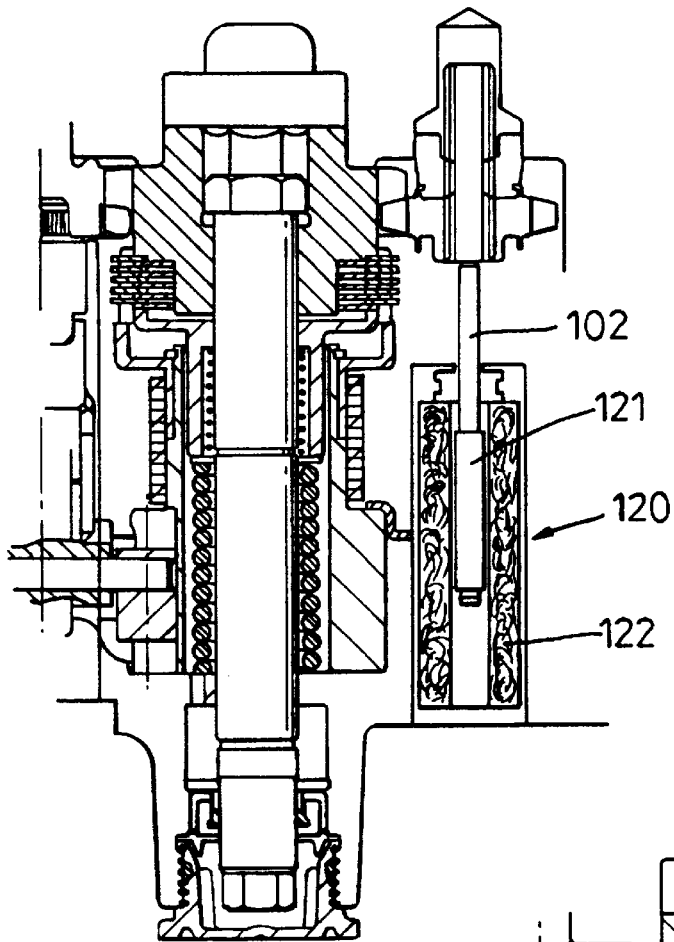
FIG. 11 is a view similar to FIG. 10 but incorporating a modified wear sensor.

In the modified construction illustrated in FIG. 11 the linear potentiometer is replaced by a sensor 120 of the inductive type. In this construction the rod 102 carries an armature 121 which is surrounded by an inductive coil 122.

Figure 12:
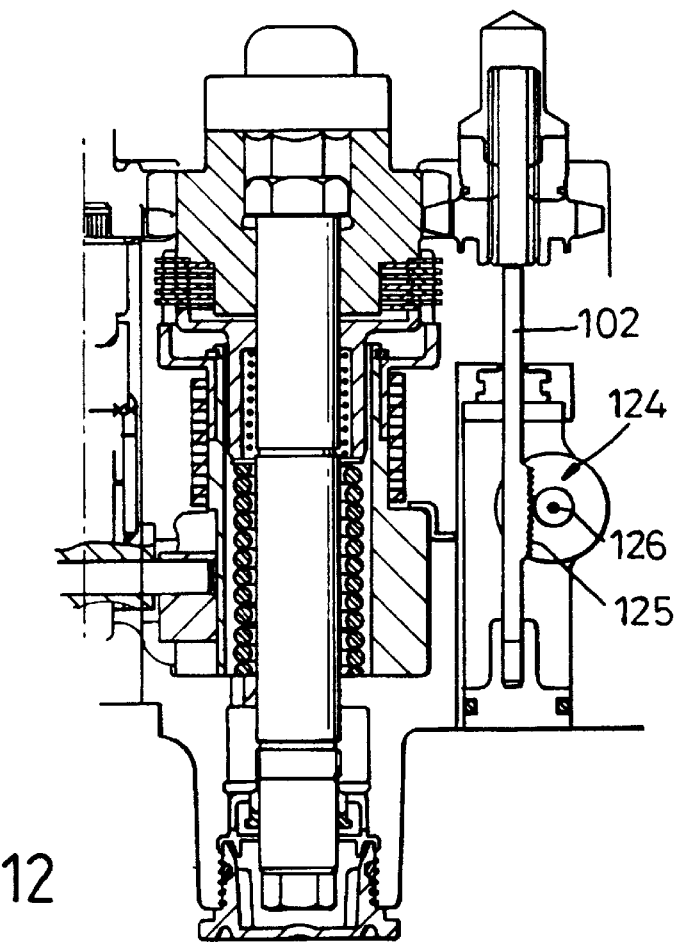
FIG. 12 is another view similar to FIG. 10 but incorporating a different wear sensor.

The construction and operation of the sensing means illustrated in FIG. 12 is otherwise the same as that of FIG. 10 and corresponding reference numerals have been applied to corresponding parts.

In this construction illustrated in FIG. 12 of the accompanying drawings, the sensing means comprises a rotary potentiometer 124. In this construction the rod 102 is modified to include a rack 125 for co-operation with a rotary pinion 126.

Figure 13:
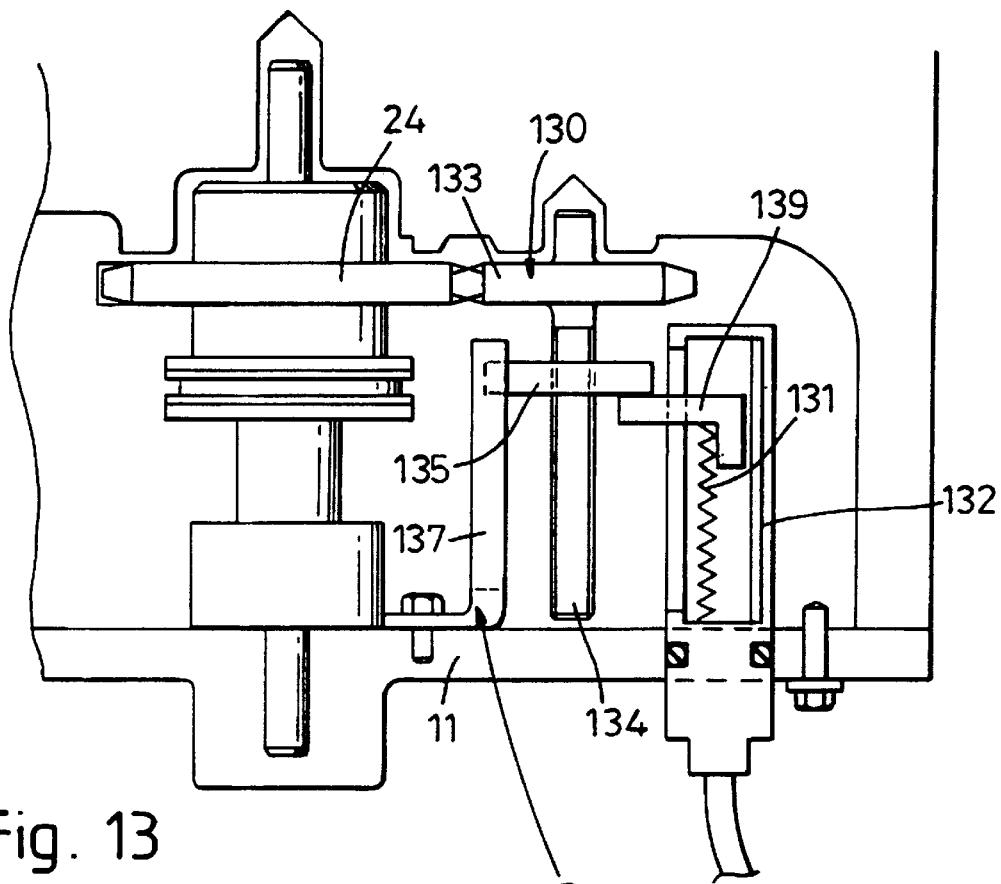
FIG. 13 is yet another view similar to FIG. 10 but incorporating another wear sensor.
Figure 14:
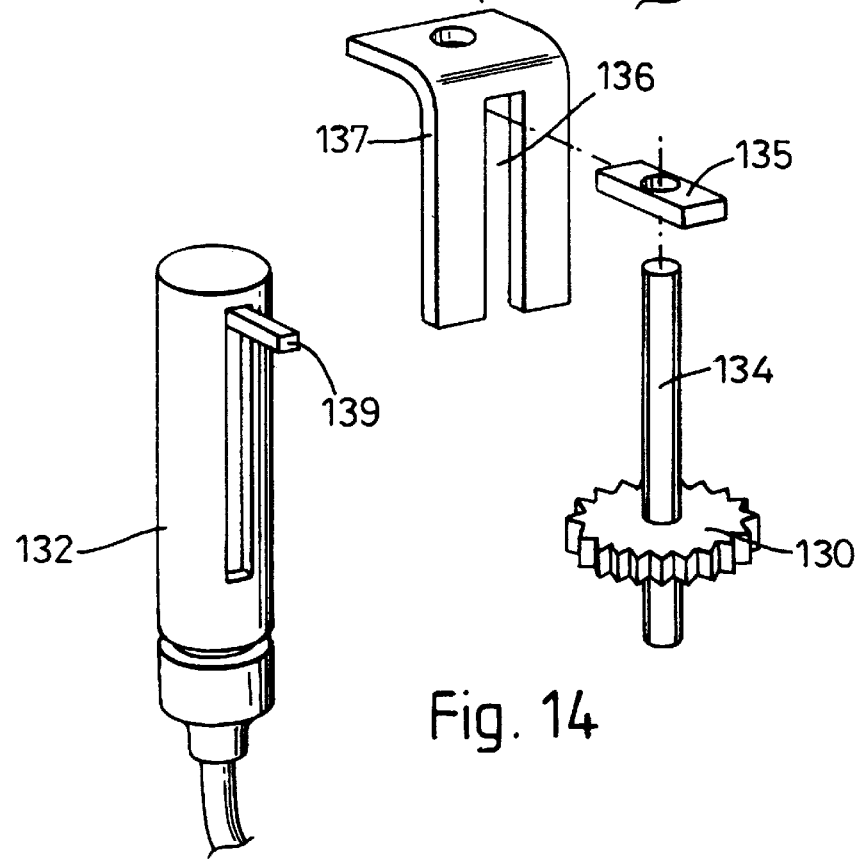
FIG. 14 is an exploded view of the means components of the wear sensor of FIG. 13.

In the modified construction illustrated in FIGS. 13 and 14 of the accompanying drawings the wear sensing member comprises a pinion assembly 130 spaced radially from the sensor which comprises a linear potentiometer 131 housed within a cartridge 132.

The pinion assembly 130 comprises a pinion 133 meshing with the pinion 24 and provided with a longitudinally extending threaded stem 134. A radially elongate nut 135 threadedly mounted on the stem 134 is held against rotation by a sliding engagement in a longitudinally extending slot 136 in a bracket 137 which is upstanding from the cover 11.

The nut 135 acts on a slide member 139 of the potentiometer 131 so that longitudinal movement of the nut 135 in response to rotary movement of the pinion 130 is transmitted to the slide member 137.

As in the embodiments of FIGS. 10–12, upon replacement of the cartridge in following service, the potentiometer 131 will automatically be re-set to the given wear condition by the corresponding position of the nut 135.

Figure 15:
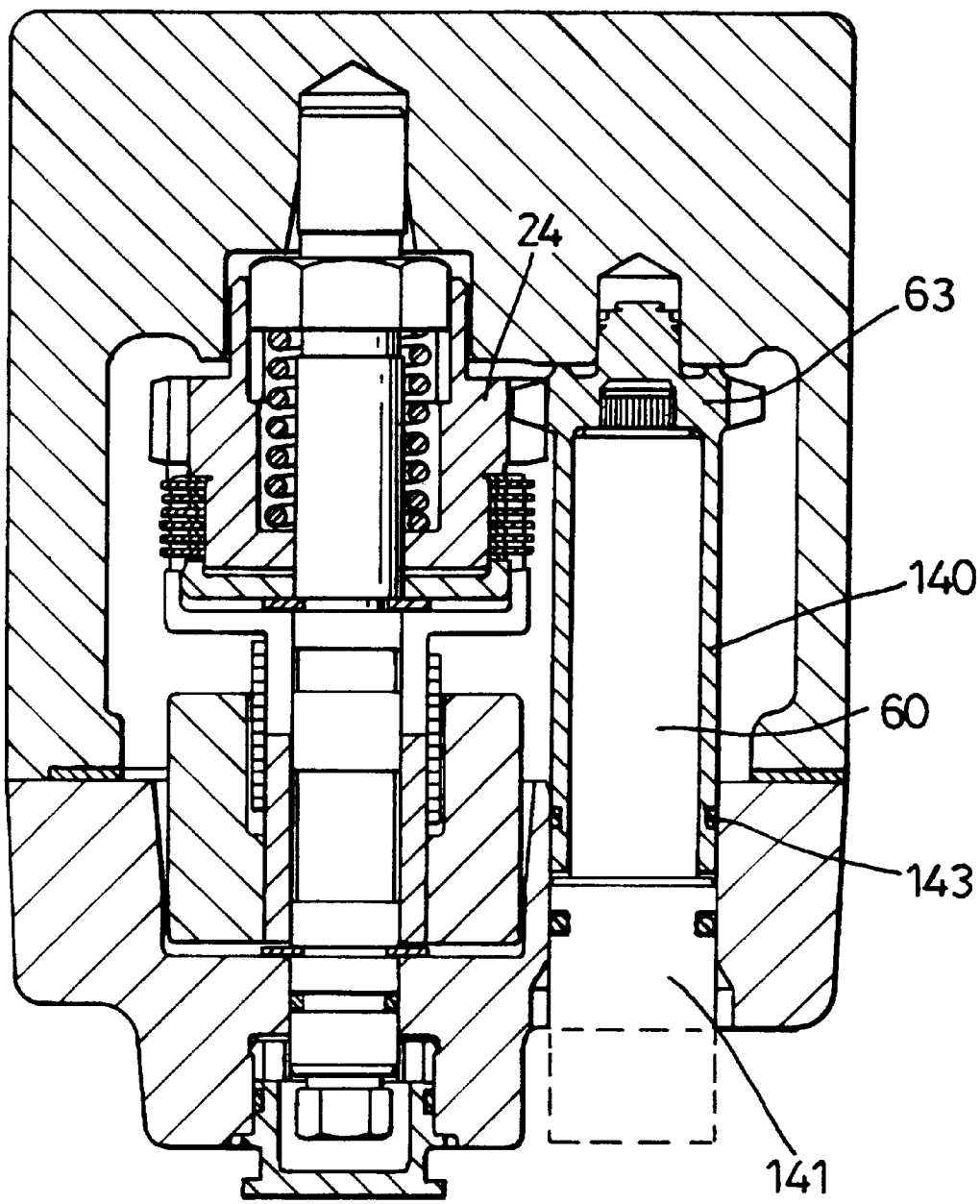
FIG. 15 is a portion of the brake of FIG. 1 but including a modified wear sensor.

Another modified construction, similar to that of FIGS. 1–9 is illustrated in FIG. 15 of the accompanying drawings.

In this construction the pinion 63 is formed with an extended hollow tube 140 which forms a housing for the sensor 60, and the opening in the cover 11 is closed by a sealed plug 141 when the sensor 60 is housed within the tube 140. The tube 140 carries an extend seal 143 in sealing engagement with the opening in the cover 11.

After removal of the plug 141, the sensor 60 can be removed from the tube 140 and serviced, and then replaced. During the period that the sensor 60 has been removed, the seal 143 between the tube 140 and the cover 11 ensures that the interior of the brake is sealed from ingress of dirt and other deleterious material.

Figure 16:
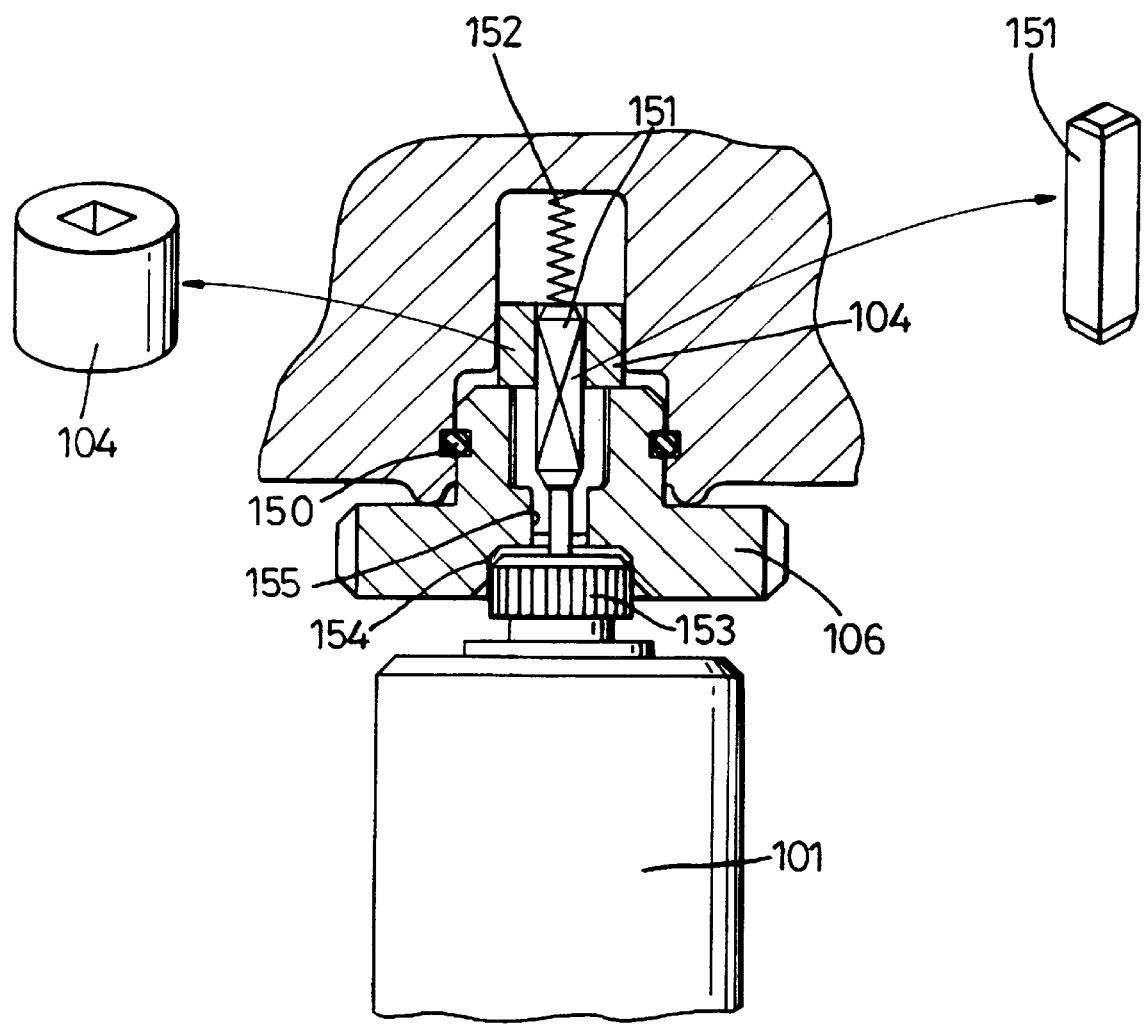
FIG. 16 is a view similar to FIG. 10 but showing a modification.

In the construction illustrated in FIG. 16 of the accompanying drawings the pinion 106 is disconnected from the bush 104 and is held captive in the bore by a circlip or snap ring 150 which is received in complementary grooves in the pinion 106 and in the wall of the bore. The lead screw 107 is replaced by a transmission peg 151 of square cross section which is slidably guided through a bore in the bush 104 of complementary cross section. The peg 151 is urged by a spring 152 into engagement with an extending screw threaded head 153 on the load sensor in screw threaded engagement with a recess 154 in the pinion 106. The pinion 106 has a central bore 155 also of square cross section and from which the peg 151 is normally spaced when the pads are new.

As the pads wear and the head 153 moves bodily axially relatively away from the pinion in response to relative rotation therebetween. The peg 151 moves axially under the load in the spring 152 until the peg aligns with the square bore 155 in the pinion 106, and engages in it to prevent further rotation of the adjuster.

In a modification the peg 151 may be of any convenient section complementary to that of the bore in the bush 104. For example the peg could be star shaped, or of splined outline, whereby to provide a greater number of possible engagement positions, the smaller the distance the adjuster can move before the lock is applied. Thus any change in sensor reading relative to the position of the brake is minimised.

What is claimed is:

1. Brake lining wear monitoring means for monitoring the wear condition of a brake assembly having a body and a friction lining having an operative face adapted to be applied to a brake rotor, wherein said brake assembly comprises an actuator for applying said brake lining to said brake rotor, an adjuster adapted to be driven by said actuator for the purpose of maintaining said brake lining in close proximity to said brake rotor, said adjuster having a wheel, and said brake lining wear monitoring means comprising a wear sensor responsive to actuation movement of said brake lining in a brake-applying direction and wherein said wear sensor is housed within said body of said brake itself without increasing the overall package size of said brake, and said wear sensor is driven from said wheel on said adjuster with an end of said wear sensor remote from said wheel being formed into a connector to provide a compact and integrated unit which can be removed from said brake for service without dismantling said brake adjuster and without dismantling said brake assembly itself.

2. Monitoring means according to claim 1, in which said wear sensor is in the form of a linear potentiometer.

3. Monitoring means according to claim 1 wherein said wear sensor comprises a rotary potentiometer driven from an adjuster wheel through a gear drive.

4. Monitoring means according to claim 1 wherein said wear sensor comprises a sensor of the inductive type.

5. Monitoring means according to claim 1, wherein an external connector for said wear sensor extends axially from said sensing means.

6. Monitoring means according to claim 5, wherein said external connection has a 90° bead to facilitate installation.

7. Monitoring means according to claim 1, including a flying lead, and wherein a gland seal is incorporated in the underside of a cover plate of said brake assembly.

8. Monitoring means according to claim 1, wherein said wear sensor is installed in said brake body in a bore normal to the axis of said adjuster assembly, and said wear sensor is driven from said adjuster wheel through a bevel gear arrangement.

9. Monitoring means according to claim 1, wherein said wear sensor is constructed in such a manner that it is automatically re-set by said brake to suit a given pad wear life of said lining following service and/or replacement during the service life of the brake.

10. Monitoring means according to claim 9, including a transmission mechanism of adjustable length and of which components are freely separable to enable removal of said wear sensor, without altering a datum position to which said sensor will automatically be re-set by re-assembly of said transmission mechanism.

11. Monitoring means according to claim 1, wherein said wear sensor is installed within a casing sealed to said body of said brake in such a manner that an interior of said casing is sealed from an interior of said brake upon removal of said wear sensor for service or replacement.

12. Monitoring means according to claim 11, wherein said wear sensor is installed in a hollow tube which depends from a pinion by which said wear sensor is operated and which is rotatably sealed in an opening in a casing which, in turn is sealed by a removable plug after said wear sensor is in an operative position.

* * * * *